DONALD H. LOVELL
PAUL D. ORLEMAN
INVENTORS

ATTORNEY

United States Patent Office 3,543,376
Patented Dec. 1, 1970

3,543,376
APPARATUS FOR FEEDING AND APPLYING A SPRING CLIP TO A WORKPIECE
Donald H. Lovell, Jacksonville, Fla., and Paul D. Orleman, Antioch, Calif., assignors to Kaiser Gypsum Company, Inc., Oakland, Calif., a corporation of Washington
Filed Aug. 21, 1968, Ser. No. 754,257
Int. Cl. B23q 7/10; B23p 19/04
U.S. Cl. 29—211                                              24 Claims

ABSTRACT OF THE DISCLOSURE

Improved apparatus for handling a workpiece engaging element such as a U-shaped spring clip. The apparatus generally comprises a clip grasping arm, a feeder device including a slide for receiving a clip for feeding the clip to the aforesaid arm and a common drive mechanism operatively connected to the arm and the slide of the feeder device for effecting relative advancements between the arm and the slide thereof. The common drive mechanism, after the slide receives the clip, synchronizes the relative advancements of the arm and the slide so as to simultaneously locate the arm and the slide in clip transferring relationship. The arm with the transferred clip thereon is then advanced by the common drive mechanism out of clip transferring relationship with the slide while at the same time the arm is given selected linear and arcuate movements.

BACKGROUND OF THE INVENTION

This invention relates to an apparatus for handling a workpiece engaging element such as a clip. More particularly, it relates to an improved apparatus for feeding and applying a U-shaped spring clip to a workpiece, such as a stacked bundle of gypsum boards, wherein the improved apparatus includes novel means generally comprised of a clip applying arm, a slide device and a common drive mechanism connected to the arm and slide device and wherein the common drive mechanism uniquely functions not only to transfer the clip from the slide device to the clip applying arm but also to effect advancement of the clip applying arm, after receiving the clip from the slide device, towards the workpiece so as to effect the application of the transferred clip thereto.

Various apparatus have been designed in the past for handling a spring clip such as as exemplified in U.S. Pat. 2,707,818 to Page, granted on May 10, 1955, and U.S. Pat. 2,862,289 to Womack et al., granted on Dec. 2, 1958. One of the principal deficiencies of the prior clip handling apparatus is that the apparatus fails to provide means for positively holding a given spring clip at all times during feeding and application of the resilient clip to a workpiece.

SUMMARY OF THE INVENTION

It is the primary purpose of the instant invention to provide an improved apparatus for handling a workpiece engaging element such as a spring clip wherein the apparatus includes unique means not only for feeding a spring clip to the workpiece but also for applying the said clip thereto.

The apparatus of the instant invention not only positively holds a clip during feeding and application of a given clip to a workpiece but such holding is done without inhibiting the feeding and application of successive clips to one or more workpieces at a mass production rate, thereby providing fail-safe operation of the apparatus.

BRIEF DESCRIPTION OF THE DRAWINGS

FIG. 3 is a top plan as seen from a position along line 3—3 of FIG. 1 with parts broken away and other parts added;

FIG. 7 is an enlarged sectional view similar to FIG. 6 but with the clip applying arm advancing in a direction outwardly of the feeder device of the apparatus;

FIG. 8 is a longitudinal vertical section taken on a plane at a position indicated by line 8—8 of FIG. 5 with parts added and other parts broken away;

FIG. 10 is a sectional view, similar to FIG. 2, of the forward end of the clip applying arm but after the clip applying arm is being advanced in a direction away from the workpiece;

DETAILED DESCRIPTION

With further reference to the drawings and particularly FIGS. 1–11, a preferred embodiment of the apparatus 10 of the instant invention for feeding and applying a U-shaped spring clip C to a workpiece W generally comprises a clip feeder device 12 provided with a slide 30, a clip applying arm 14 and a common drive mechanism generally indicated at 16 connected to both the slide 30 of the feeder device 12 and the clip applying arm 14. A framework 18 mounts the feeder device 12, arm 14 and common drive mechanism 16 in operative relationship to each other. The feeder device 12 includes a magazine 28 for feeding its bottommost clip C to the slide 30 thereof in order to effect transfer of a bottommost clip C to the clip applying arm 14. The arm 14 includes a unique pair of fingers 15 for receiving and graspingly engaging a clip C from the feeder device 12 when the arm 14 and feeder device are in clip transferring relationship (FIG. 1), as will become more apparent hereinafter. After the fingers 15 receive and graspingly engage the clip C from the feeder device 12, the common drive mechanism 16 advances the arm 14 toward a workpiece W into clip applying relationship therewith (FIG. 2) so as to effect application of the clip C thereto.

A cam device 20 is disposed in relation to the arm 14 and the common drive mechanism 16 and effects selected linear and arcuate movements of said arm 14 during movement thereof by said common drive means 16 between the workpiece W and the feeder device 12. Such movements of the arm 14 enables the clip C to be transferred to the arm 14 from the feeder device 12 in one planar position, preferably horizontal, and then enables the clip C to be oriented to another planar position, preferably vertical, upon advancement of the arm 14 with the clip C thereon toward the workpiece W, in order to effect application of the clip C thereto.

As will become more apparent hereinafter, the common drive mechanism 16 is not only arranged for moving the slide 30 and arm 14 in opposite directions relative to each other but also for moving the slide 30 and arm 14 different distances. Various stop elements, as will be subsequently described, are associated with the feeder device 12, arm 14, common drive mechanism 16 and the framework 18, whereby the arm 14 can be located in precise clip applying relationship with the workpiece W; whereby the arm 14 and the feeder device 12 can be located in precise clip transferring relationship relative to each other; and whereby the slide 30 of the feeder device can be located in alignment with the bottommost clip C of the magazine 28.

Figures 4, 5, 5A, 6, 9:
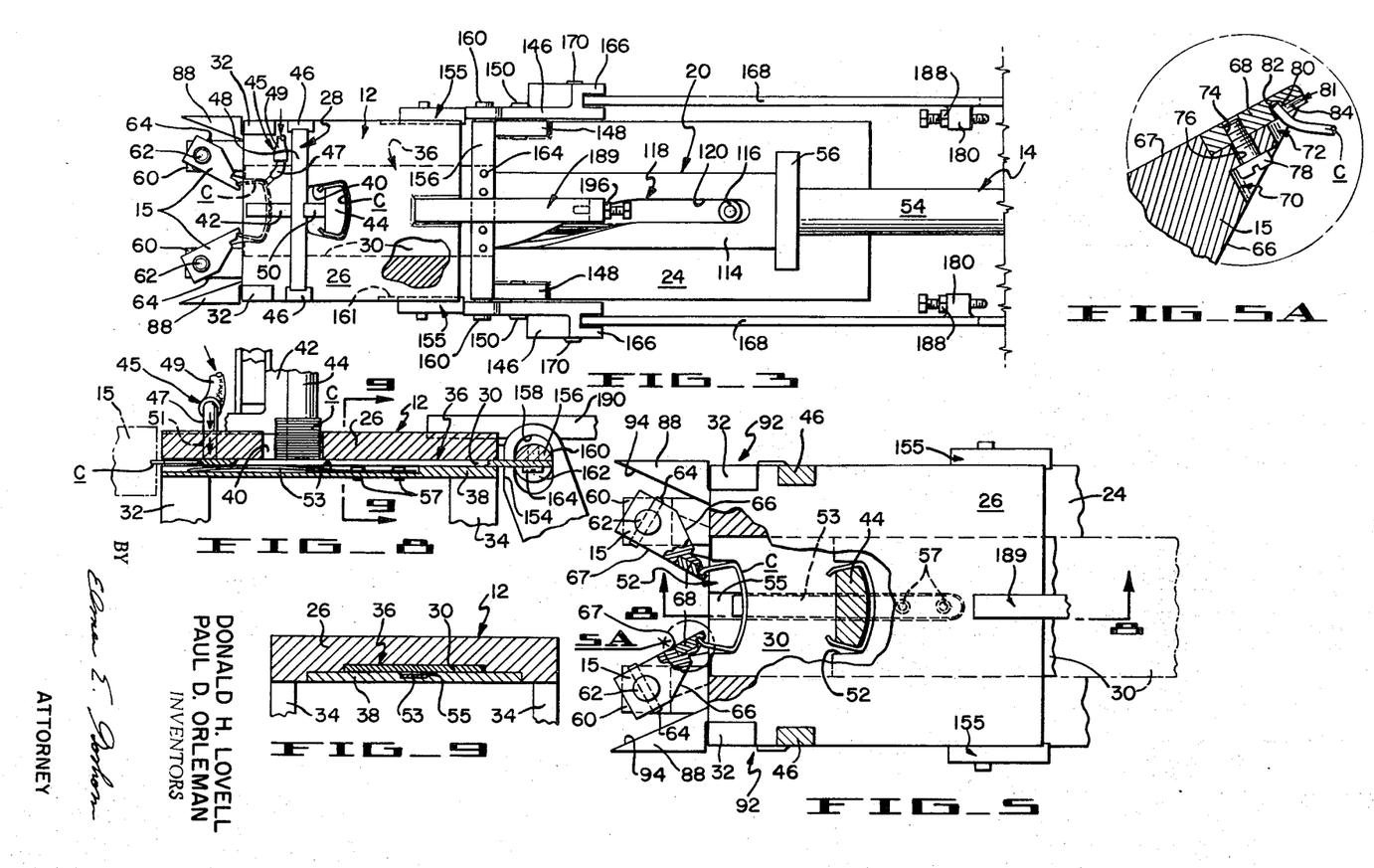
FIG. 4 is a view similar to FIG. 3 but with the apparatus in a more advanced stage of operation from that shown in FIG. 3.
FIG. 5 is an enlarged fragmentary horizontal section taken on line 5—5 of FIG. 1 with parts broken away and illustrates details of the apparatus.
FIG. 5A is an enlarged sectional view taken within the bounds of circumscribing line 5A of FIG. 5 and illustrates details of the apparatus.
FIG. 6 is an enlarged horizontal fragmentary section taken on line 6—6 of FIG. 1 with parts removed and broken away and other parts shown in dotted lines and illustrates details of the apparatus for effecting transfer of the spring clip from the feeder device to the clip applying arm.
FIG. 9 is a transverse vertical section taken on a plane at a position indicated by line 9—9 of FIG. 8.
Figure 4:
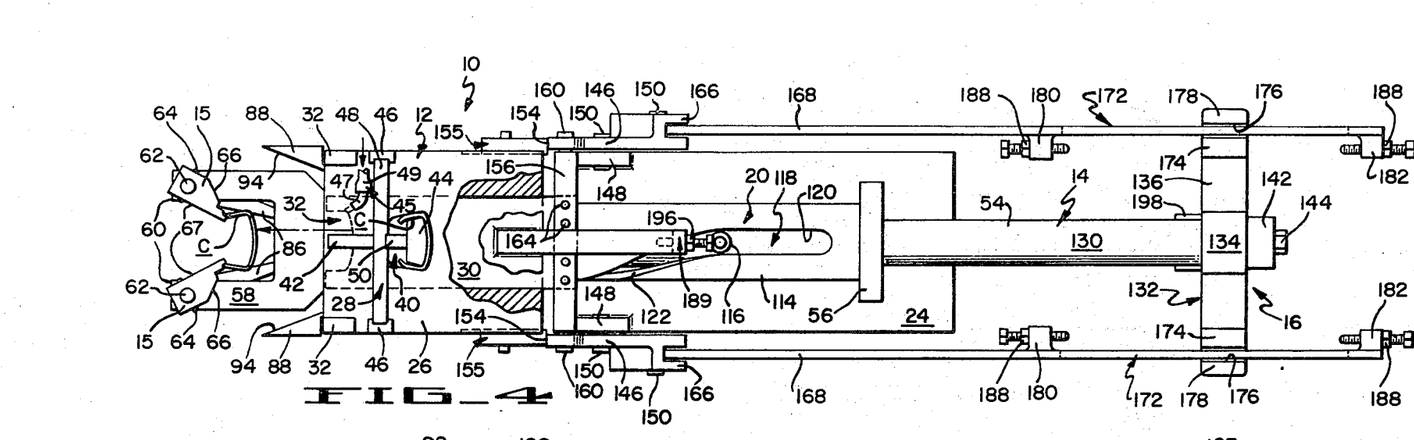
Figure 5:
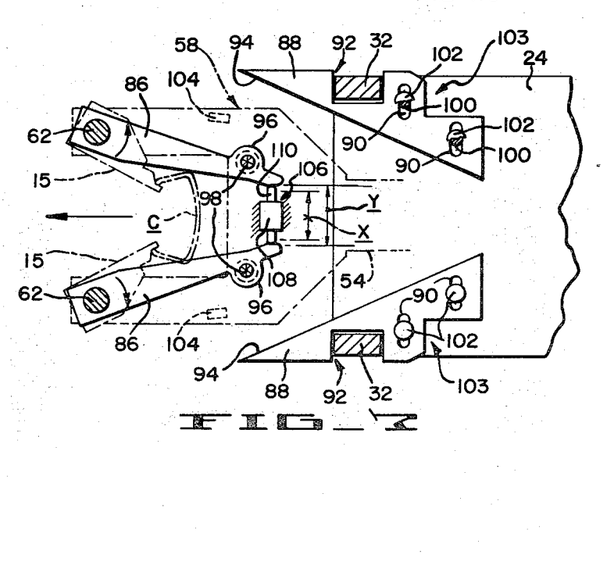
Figure 6:
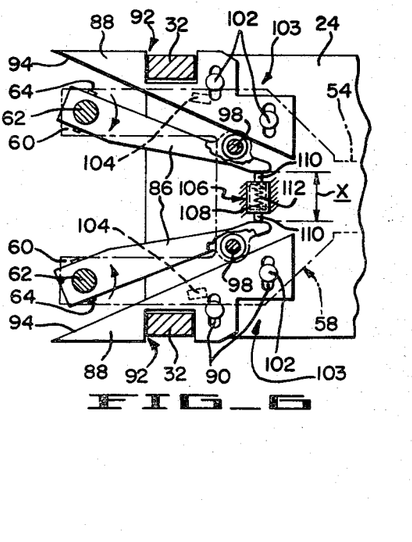

The clips C are of a desired wire size and are normally made up of an appropriate grade of resilient steel material and can be of the type such as illustrated in U.S. Pat. 2,393,514 granted to Bicknell on Jan. 22, 1946. In order to facilitate grasping engagement by the fingers 15 on the arm 14, the outer ends of the U-shaped spring clip C can be slightly bent in an inward direction, as best shown in FIGS. 5 and 5A.

Figures 1, 11:
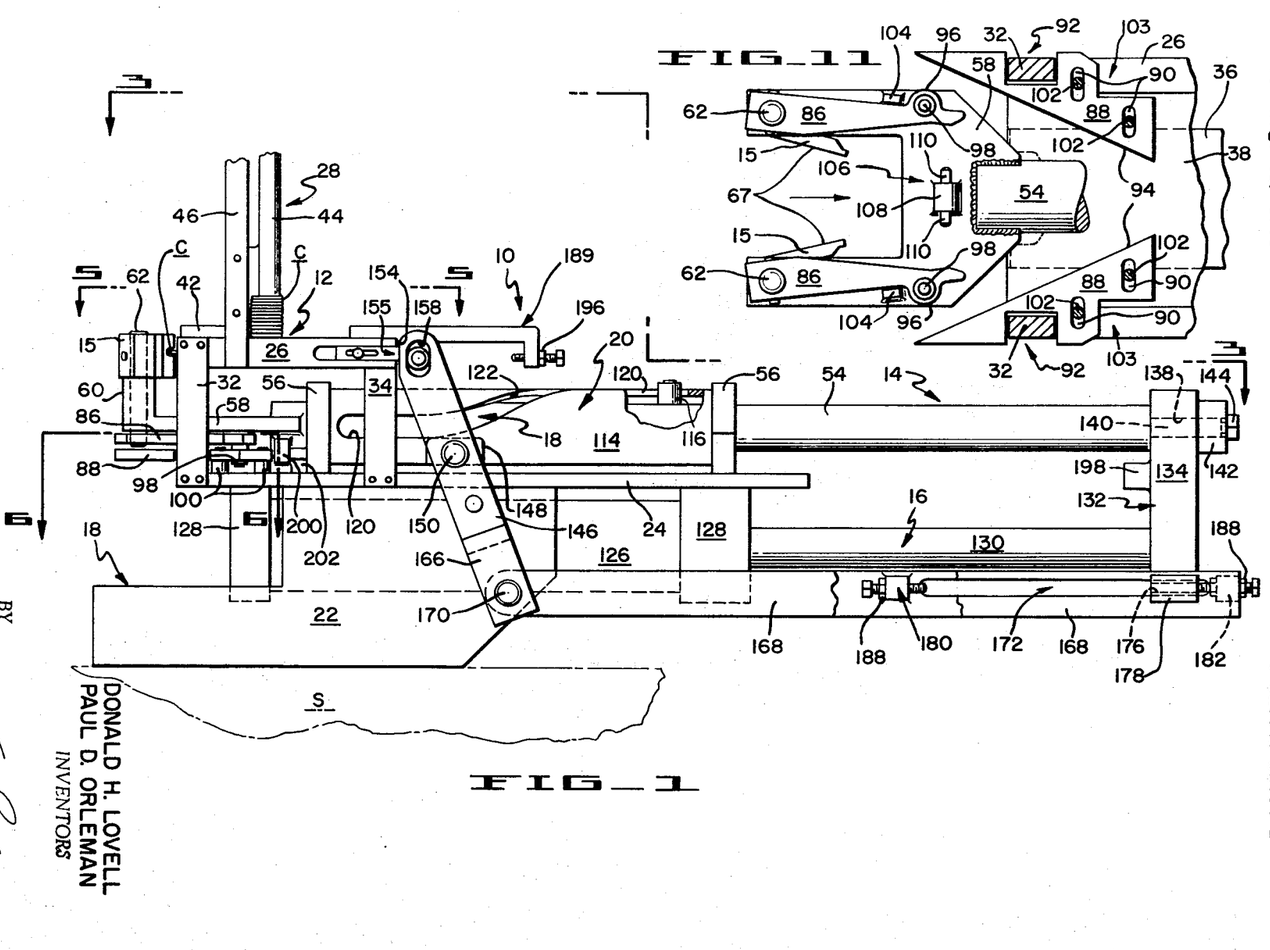
FIG. 1 is an elevation with certain parts broken away of a clip feeding and applying apparatus embodying the present invention and illustrates an operative position of the apparatus for effecting transfer of a spring clip from a feeder device of the apparatus to a clip applying arm thereof.
FIG. 11 is a view similar to FIG. 7 but with the clip applying arm being advanced in a direction toward the clip feeder device of the apparatus prior to receiving a spring clip from the feeder device to be fed to a given workpiece.
Figures 1B, 2, 2A:
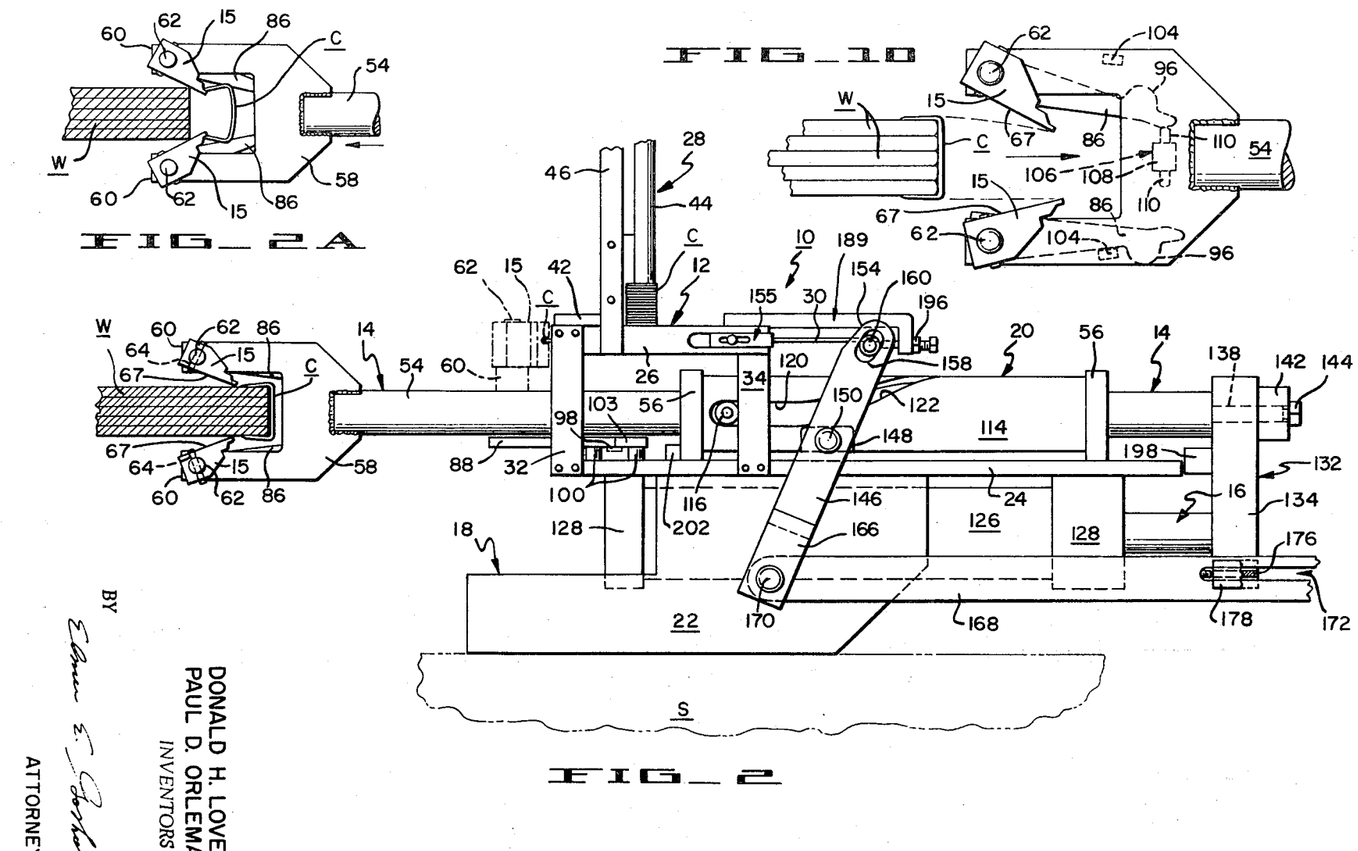
FIG. 2 is another elevation with parts broken away and illustrates a clip applying position in full lines and a clip transferring position in dash lines.
FIG. 2A is a fragmentary view of the forward end of the clip applying arm of the apparatus of FIG. 2 and illustrates a more advanced stage of operation in the clip applying position of the apparatus.

As best indicated in FIGS. 2 and 10, the workpiece W may be a plurality of loosely-stacked gypsum boards with their side edges in congruent relation about the periphery thereof. By virtue of the apparatus 10 of the instant invention, a clip C can be readily attached to one or more side edges of the workpiece W in a desired manner in order that the stacked gypsum boards making up the workpiece W are tightly bound together into a unitized package for facilitating subsequent processing and handling. It is to be understood that successive workpieces W can be moved along a conveyor (not shown) in a direction perpendicular to the plane of the drawings as viewed in FIG. 2. During movement of successive workpieces W along the conveyor (not shown), the apparatus 10 is disposed in operative relation to a workpiece W therealong, whereby one or more clips C can be attached to each one of the successive workpieces W at a mass production rate, as will be more fully apparent hereinafter.

The framework 18 generally comprises a pair of parallel spaced upstanding plates 22 of approximately L-shaped configuration, only one of which is shown in FIGS. 1–2, a support S connected to the lower and longest edges of the upstanding plates 22 and a cover plate 24 connected at intermediate and spaced bottom surface portions thereof to the upper edges of the plates 22, as indicated in FIGS. 1–2. The cover plate 24 is usually longer than the plates 22.

The clip feeder device 12 is generally comprised of a base plate 26, an upstanding magazine 28 attached to the base plate 26 for holding a plurality of clips C in vertically stacked relation and a reciprocal slide element or bar 30 slidingly received in the base plate 26. The feeder 12 is mounted above and in spaced relation to the cover plate 24 of the framework 18 by two pairs of legs 32 and 34. The legs 32 have upper ends connected to the front corners of the base plate 26 and lower ends connected to the front corners of the cover plate 24, as depicted in FIGS. 1–4. The other pair of legs 34 at the upper ends thereof are connected to the base plate 26 at the rear corners thereof and at their lower ends to the cover plate in channel-shaped recesses along the side edges thereof.

The underneath or bottom side of the base plate 26 includes a downwardly facing recess 36 (FIGS. 8 and 9) of stepped channel-shaped configuration extending longitudinally between the left and right edges thereof. A cover plate 38 of a length corresponding to the length of the base plate 26 and of a width and thickness corresponding to the outer and enlarged portion of the stepped channel-shaped recess 36 is suitably connected to the bottom of the base plate 26. Such connection of the plate 38 closes off the open and downwardly facing side of the smaller and inner portion of the stepped channel-shaped recess 36. The slide 30 is of a width and thickness substantially corresponding to the width and depth of the inner portion of the stepped channel-shaped recess 36 and is slidably received between the opposed surface portions of the cover plate 38 and the plate 26 defining the bottom of the recess 36 such that the slide 30 is freely advanceable between the longitudinal ends of the plate 26. The slide 30 is somewhat longer than the base plate 26.

The base plate 26 includes an aperture 40 of trapezoidally-shaped configuration extending transversely of the base plate 26 between the top surface thereof and a bottom surface portion of the plate 26 defining the bottom of the downwardly facing channel-shaped recess 36 whereby the aperture 40 is in direct open communication from the top of the plate 26 to the inner portion of the stepped channel-shaped recess 36. The aperture 40 is intermediate the ends of the plate 26 and symmetrical about the longitudinal axis thereof in the manner illustrated in FIGS. 3–4 and 8. As indicated in FIGS. 3–4, the aperture 40 includes opposed sides that diverge outwardly in a direction to connect with the arcuate-shaped side thereof whereby the overall size of the aperture is somewhat larger than the overall size of a given spring clip C whereby the spring clip can be freely disposed within the aperture 40.

The magazine 28 affixed to the top of the plate 26 holds a desired number of the clips C in vertically stacked and nested relation to each other and in alignment with the aperture 40. The bottom surface portion of the lowermost clip C in the stack is disposed within the bottom of the aperture 40 and in planar alignment with the bottom surface portion of the plate 26 adjacent to the recess 36 in order to effect timely transfer of the lowermost clip C to the slide 30, as will be subsequently described.

The magazine 28 is comprised of an L-shaped support leg 42 having a horizontally disposed section affixed to the top surface of the base plate 26 along the longitudinal axis thereof and adjacent the leftward edge thereof as viewed in FIGS. 1–4 and 8. A vertical post 44 is attached to the vertical section of the leg 42 in such a manner that the lower end of the post 44 is inserted and concentrically disposed within the aperture 40. The lower surface of the post 44 is disposed in substantially planar alignment with a bottom surface of the plate 26, as indicated in FIG. 8. As is evident in FIG. 3, the post 44 in transverse section is of trapezoidally-shaped configuration similar to the configuration of the aperture 40 but of an overall size smaller than the aperture. The smaller cross section of the post 44 enables it to engage a substantial extent of the inside of any given clip C in order that a plurality of clips C can be freely stacked in vertical and nested relation to each other on the post 44. In this manner, the stacked clips freely drop, without binding engagement on the post 44 and, under the influence of gravity, toward the lower end of the post 44 within the aperture 40. Further, the lower end of the post 44, which is in the aperture, is spaced from the plate 26. Such spacing assures ample clearance for free fall of the clips C down through the aperture, thereby enabling the magazine 28 to adequately supply clips C to the feeder device 12.

If desired, the upper end of the post 44 can be reinforced by upstanding bars 46 (FIGS. 2 and 3), a cross bar 48 interconnecting the upper ends of the bars 46 and a spacer block 50 connecting the upper end of the post 44 to an intermediate portion of the cross bar 48. The lower ends of the bars 46 are connected to opposed sides of the base plate 26 and disposed within transversely aligned channel-shaped grooves provided therein.

The slide 30 (FIG. 5) is provided with an inwardly extending slot or pocket 52 of approximately channel-shaped configuration. The slot has an arcuate edge corresponding to the arcuate edge of the aperture 40. Thus, upon movement of the slide 30 into a position where the arcuate edge of the slot is aligned with the arcuate edge of the aperture 40, the lower clip of the stack of clips drops into the slot 52. Then, when the slide with the clip C in the slot 52 is moved toward the left, as viewed in FIG. 8, the aperture 40 is closed off by the trailing portion of the slide 30, thereby arresting downward movement of the next bottommost clip C on the post 44.

During advancement of the slide 30 toward the left (FIGS. 5 and 8), the opposed surfaces of the base plate 26 and cover plate 38 cooperatively act in conjunction with the slide 30 so as to hold the arcuate portion of the transferred clip C in abutting engagement with the arcuate edge of the slot 52 of the slide 30, thereby maintaining the clip C in centered relation in the slot and resisting movement of the clip C out of such centered relation. Thus, the cooperative relationship between the slide 30, the cover plate 38 and the base plate 26 during advancement of the slide 30 affirmatively holds the clip C at the proper attitude in order to effect delivery of the held clip C to the fingers 15 (FIG. 3) of the arm 14 when the arm 14 and slide 30 are in clip transferring relationship.

In order to prevent any tendency of the clip C to move out of centered relation in the pocket 52, a biasing element 53 (FIGS. 5 and 8) is preferably employed. The biasing element 53 is a strip of resilient spring material and is formed in the shape of a leaf spring having an arcuate portion and a relatively short length straight portion. The spring 53 is mounted in a closed end channel-shaped groove 55 formed on the upwardly facing inner surface portion of the cover plate 38 (FIGS. 5, 8 and 9). The groove 55 extends longitudinally inward from the forward end of the plate 38 substantially beyond the aperture 40 but terminates inwardly of the rear end of the plate 26. Further, the groove 55 is symmetrical about the longitudinal axis of the plate 38. The leaf spring 53 is mounted in the groove 55 so that the straight portion thereof is riveted or otherwise anchored at 57 to the cover plate 38 adjacent the closed end of the groove 55 whereby the arcuate portion of the spring 53 is between the aperture 40 and the forward end of the plate 38. The arcuate portion of the spring 53 is shaped so as to be disposed substantially above the upwardly facing inner surface of the plate 38. Thus, the arcuate portion is compressed by slidable engagement with the trailing portion of the slide 30 particularly when the slide 30 is advanced toward the front end of the plate 26. Such compression of the arcuate portion of the spring 53 not only resiliently stresses the spring but also assures pressured sliding engagement with a centered part of the arcuate portion of the clip C, thereby urging the arcuate portion of the clip C into positive abutting engagement with the arcuate edge of the slot 52 so as to assure holding of the clip C in centered relation with the slot 52 until the advancing slide 30 effects transfer of the slot-held clip C onto the fingers 15 of the arm 14.

The clip C is formed of wire preferably having a circular cross section and a diameter somewhat less than the thickness of the slide 30, thereby minimizing binding engagement of the clip C during its transfer from the lower end of the post 44 of the magazine 28 to the slide 30 and then during advancement of the slide 30 from this clip pickup position to the clip feeding position where the fingers 15 and slide 30 are in clip transferring relationship.

In order to prevent the buildup of debris within the inner and smaller portion of the stepped recess 36, a cleaning device 45 (FIGS. 3 and 8) is provided. The cleaning device 45 is generally comprised of an elbow-shaped tubular fitting 47 and a length of flexible conduit 49 connected to one end of the fitting 47. The other end of the fitting 47 is connected to an opening 51 extending down through the front portion of the plate 26 to the recess 36 whereby the fitting 47 and conduit 49 are connected to the recess 36. A source (not shown) of air under pressure is connected to the conduit 49, thereby directing pressurized air into the recess 36. Such a flow of air under pressure, in being admitted to the recess 36 in a continuous or pulsating fashion and emerging from the front of the recess 36, cleans the recess 36 by effectively removing the build-up of foreign matter within the recess 36 and at the same time minimizes entry of such foreign matter. In the absence of the cleaning device 45, the slide 30, including a given clip C being fed by the slide 30 in the manner aforedescribed, could possibly become bound in the recess 36 during operation of the apparatus 10 due to the build-up of foreign debris in the recess 36.

The clip applying arm 14 (FIG. 2) is generally comprised of a rod 54, a pair of spaced plates 56 affixed to the top surface of the cover plate 24 and having a pair of aligned apertures therein which slidably receive the rod 54. If desired, bearings (not shown) can be mounted in the apertures for facilitating slidable engagement with the rod 54. The forward end of the rod includes a bifurcated element 58, the outer ends of which include laterally extending projections 60, as best indicated in FIGS. 1–4. Each finger 15 is pivotally mounted to its upstanding projection 60 and the associated outer end portion of the bifurcated element 58 by a shaft 62 (FIGS. 1 and 5) extending through aligned apertures in each finger 15 and the associated projection 60, and the fingers 15 are affixed to their associated shafts 62 by pins 64 in the manner best shown in FIGS. 2 and 6.

The fingers 15 (FIG. 5) have clip engaging ends which are partially cut away to define beveled surfaces 66 that converge toward the longitudinal axis of the rod 54 of the clip applying arm 14. Moreover, as best indicated in FIGS. 5 and 5A, the side 67 of each one of the fingers 15 opposite the beveled surface portion 66 thereof is partially cut away at its clip engaging end to define a recess for mounting a clip engaging insert 68. Each finger 15 is also cut out on the beveled surface portion 66 adjacent the clip engaging end to define a recess 70 for facilitating attachment of the insert 68 to the finger. Each recess 70 is aligned with an opening 76 in its finger, and the opening is aligned with a threaded opening 74 in the insert 68. Each insert 68 is affixed to its finger 15 by a cap screw 78 threaded into opening 74 and otherwise located in the opening 76 and recess 70. The clip engaging end of each finger is provided with a transverse groove 72 (FIGS. 5 and 5A), and the associated insert 68 includes a composite groove 81 disposed toward the groove 72 for receiving and graspingly engaging an outer inwardly bent end portion of a clip C. The composite groove 81 is comprised of a groove 84 extending longitudinally inward from the outer end of each insert 68 and another closed end groove 82 extending transversely of the insert 68 and intersecting the inner end of the groove 84 so as to define a common ledge 80 therebetween. When a clip C is held by the base plate 26 and slide 30 of the feeder device 12 in clip transferring relationship with the fingers 15 of the arm 14, the outer ends of the clip C first slidably engage the grooves 84 of the inserts 68. The grooves 84 guide the outer ends of the clip C into the grooves 82 whereby the ledges 80 bindingly engage the outer ends of the clip C. Thus, the fingers 15 grasp the clip C until applied to the workpiece W, as will be subsequently described.

In order to controllably pivot the pair of fingers 15 to a retracted position for graspingly engaging the ends of the clip C when the clip applying arm 14 is in clip transferring relationship with the feeder device 12, cam follower arms 86 (FIGS. 1, 6 and 7) are connected to the lower ends of the shafts 62 so that the arms 86 generally extend in the same direction but in acute angular relation to the clip engaging ends of the fingers 15. The purpose of this angular relation is to assure that the fingers 15 are retracted for graspingly engaging the ends of the clip when the fingers 15 are in clip transferring relationship.

A pair of cam plates 88 (FIGS. 1, 6 and 7) are adjustably affixed to the top surface of the cover plate 24 of the framework 18. Each cam plate 88 is approximately of triangularly-shaped configuration and has a pair of spaced parallel, laterally offset elongate slots 90 and a groove 92 slidably fitted over the lower ends of their associated legs 32. Mounted in this fashion, the beveled edges 94 of the plates 88 diverge outwardly relative to each other.

Each one of the cam follower arms 86 at the outer end thereof includes a laterally extending arcuate projection 96 (FIG. 7) disposed along the outer side edge thereof. A pin 98 has one end connected to each projection 96 and an opposite enlarged roller end disposed for rolling engagement with the beveled edge 94 of the associated cam plate 88 when the clip applying arm 14 is advancing toward the feeder device 12 into clip transferring relationship therewith, as indicated in FIG. 6. To assure that the pins 98 do not bindingly engage the top of the cover plate 24 during sliding engagement with their associated beveled edges 94 on the cam plates 88, each cam plate 88 is preferably mounted on a pair of stanchion sleeves 100 aligned with the elongated slots 90 of the cam plate 88, as indicated in FIG. 1.

In order to facilitate lateral adjustment of the cam plates 88 relative to each other and to the pins 98, each plate 88 is provided with an angular recess 103 (FIG. 7). This recess 103 on each cam plate 88 thereby provides convenient end portions which can be grasped in order to laterally adjust the plates. The beveled edge portions 94 of the cam plates 88 are properly adjusted when the follower pins 98 engage the edge portions 94 and cause the follower arms 86 and thus the fingers 15 to pivot to a retracted or clip-receiving position with the arm 14 and feeder device 12 in clip-transferring relationship. When adjusted in this manner, the cam plates 88 are secured to the cover plate by cap screw assemblies 102 passing through the slots 90 and aligned sleeves 100 in a known fashion.

As indicated in FIGS. 6-7 and 10-11, a pair of lugs 104 are provided on the follower or backside of the fork element 58. The lugs 104 are affixed to opposed side edges of the fork element 58 and are disposed between the finger shafts 62 and pins 98 of the follower arms 86. These lugs 104 abuttingly engage the outer side edges of the follower arms 86 so as to limit the outward pivotal movement of the arms 86 and, in turn, limit the outward pivotal movement of the fingers 15. The cam plates 88 have apex ends which extend outwardly of the cover plate 24. The distance between these apex ends is greater than the distance between the pins 98 when the arms 86 abut their respective lugs 104. This arrangement assures that the pins 98 are in rolling engagement with their respective cam edge portions 94 whenever the arm 14 is being advanced into clip transferring relationship with the feeder device 12.

In order to limit the pivotal movement of the follower arms 86 in the opposite direction to a retracted clip-receiving position, to assure biased rolling engagement of the pins 98 with their beveled edges 94 on the cam plates 88, and to enable retention of a given clip on and between the fingers 15, a biasing stop mechanism 106 (FIGS. 6 and 7) is affixed to the backside of the fork element 58 between the opposed inner side edges of the follower arms 86 and adjacent the outer free ends thereof. The biasing mechanism generally comprises a spring retainer 108 attached to the backside of the fork element 58. The retainer 108 is made up of a closed end sleeve having openings formed in the closed ends thereof. A pair of flanged pins 110 are assembled in the retainer 108 such that these flanged ends can abut the closed ends of the retainer 108 and such that the reduced ends thereof slidably pass through said closed ends. A coil spring 112 is interposed between the pins 110, thereby urging the pins 110 to an outwardly expanded position. Thus, when the follower arms 86 are pivoted toward a retracted position by the camming action of pins 98 and plates 88, the arms bear against the spring-biased pins 110, not only limiting the retracted position of the follower arms 86 but also assuring biased rolling engagement of the follower pins 98 with the cam plates 88. When the arm 14 is fully advanced into clip transferring relationship with the feeder device 12 (FIG. 6), the follower arms 86 are pivoted to a retracted position in which the distance between the ends of the arms 86 in abutting engagement with the pins 110 corresponds to a distance X.

After transfer of the clip C to the fingers 15 in the manners aforedescribed and shown in FIGS. 5 and 5A, the biasing mechanism 106 functions to partially expand the transferred clip C graspingly held between the fingers 15. Such partial expansion sufficiently stresses the clip C in order to assure positive holding of the clip C, particularly when the fingers 15 of the arm 14 are applying the clip C to the workpiece W. As is evident in FIGS. 6-7, the follower arms 86 are of a greater length than the fingers 15. Even though the clip C is relatively stiff as compared to the spring 112, the greater length arms 86, in effect, act as lever arms pivoting about their respective shafts 62 relative to the urgency of the spring 112 and enable the spring 112 to have a mechanical advantage, whereby the greater length follower arms 86 multiply the force of the spring 112 acting through the pins 110, arms 86, shafts 62 and fingers 15. Consequently, when the arm 14 is advanced towards the workpiece W from clip transferring relationship with the feeder device 12, the force of the spring 112, increased by the leverage of the follower arms 86, urges the follower arms 86 and, in turn, the fingers 15 to a partially expanded position against the resiliency of the clip C, as indicated by the distance Y in FIG. 7. Thus such biasing action of the spring 112, in acting through the follower arms 86, partially expands the outer ends of the clip C so as to positively hold the clip C between the fingers 15 during advancement of the arm 14 from clip transferring to clip applying position.

In advancing the fingers 15 of the clip applying arm 14 between the feeder device 12 and the workpiece W, the clip applying arm 14 is given selected linear and arcuate movements by the cam device 20 for the purpose of orienting a given clip C from a horizontal plane, at the time of transfer from the feeder device 12 to the fingers 15 of the arm 14, to a vertical plane at the time of application of the clip C from the fingers 15 thereof to the workpiece W, as indicated in FIGS. 1-2 and 12A to 12C. The cam device 20 is generally comprised of a sleeve 114 (FIGS. 1-4) and a pin 116. The sleeve 114 extends between and is connected to the spaced pair of plates 56 and concentrically circumscribes the rod 54. The sleeve 114 between the ends thereof includes an elongated slot 118 having straight end portions 120 offset from each other and parallel to the longitudinal axis of the rod 54 and further includes a helical portion 122 extending between and interconnecting the end portions 120. The end portions 120 are preferably displaced 90° from each other around the sleeve such that the rear end portion 120 of the slot as viewed in FIGS. 1-4 is disposed at the top of the sleeve 114. The slot 118 is somewhat longer than the distance traveled by the arm 14 between the feeder device 12 and the workpiece W in effecting application of a given clip C to the workpiece W. The pin 116 is adapted to move between the ends of the slot 118 in rolling engagement therewith and is affixed in a suitable fashion to an intermediate portion of the rod 54, as indicated in FIGS. 1–4.

The common drive mechanism 16 is comprised of a fluid actuator 126 (FIGS. 1, 2) having a double acting piston (not shown) and a pair of spaced blocks 128 connected to the ends of the actuator 126. The blocks 128 are connected to underneath portions of the coverplate 24 between the transversely spaced plates 22 of the framework 28. The piston rod end 130 of the actuator 126 is connected to an inverted T-shaped bar element 132, which has a lower bar portion 136 and an upwardly extending stem portion 134. The upper end of the stem portion 134 includes an opening 138. A reduced end 140 of the rod 54 is rotatably affixed to the stem portion 134 by passing the reduced end 140 through the opening 138 and then by assembling a spacer collar 142 and cap screw 144 to the outer exposed end of the reduced end portion 140. Thus, when the piston of the actuator 126 is moved in either direction, the clip applying arm 14 is moved in a corresponding fashion while at the same time being rotated through a ninety degree angle.

A pair of levers 146 are pivotally mounted intermediate their ends to a pair of laterally spaced and aligned bearings 148 that are affixed to the top of the coverplate 24 adjacent to the side edges thereof and are thus spaced from the feeder device 12, as indicated in FIGS. 1–4. Each lever 146 is pivotally connected to its associated bearings 148 by a stub shaft 150 in a conventional fashion. The left side of the lever 146 at the upper end thereof, as viewed in FIGS. 1–2, includes a beveled side edge portion that extends in a generally upward direction to merge with the arcuate-shaped end portion at the top of each lever arm 146. The upper ends of the lever arms 146 are interconnected by a cross shaft 156 for connecting the lever arms 146 to the slide 30. The upper end of each lever arm 146 includes an elongate slot 158, the straight edge portions of which are parallel to the adjacent edge portions 154. The reduced outer ends 160 of the cross shaft 156 are journalled in their associated slots 158. The cross shaft 156, intermediate the ends thereof, includes a downwardly facing channel-shaped groove 162, as indicated in FIGS. 3 and 8. The groove 162 is disposed on the shaft 156 in centered relationship to the slide 30 and is of a length between the ends of the cross shaft 156 corresponding to the width of the slide 30. The slide 30 is disposed within the groove 162 and affixed to the cross shaft 156 by cap screws 164. When the lever arms 146 are pivoted in either direction about their stub shafts 150, the slide 30 is moved in the same general direction as the lever arms within the recess 36 of the device 12 without binding engagement therewithin by virtue of the elongate slots 158 being of a greater length than the diameter of the reduced ends 160 of the shaft 156.

A pair of stop bar assemblies 155 are adjustably affixed to the side edges of the base plate 26 (FIGS. 1–4) adjacent to the levers 146. These stop assemblies 155 are located to abuttingly engage the beveled edge portions 154 of the levers 146, thereby limiting the pivotal movement of the levers in a counterclockwise direction and precisely locating the slide 30 in clip transferring relationship with the fingers 15 of the arm 14 as viewed in FIGS. 1 and 3–4.

Similarly, a stop bar essambly 189 (FIGS. 1 and 4) is generally comprised of an angle-shaped element and an adjustable cap screw threadably connected to the shorter leg section thereof. The top assembly 189 is affixed to and projects rearward from the top of the base plate 26 adjacent to the cross shaft 156, such that the cap screw thereof abuts the cross shaft 156 when the levers 146 are pivoted to a clockwise position and in turn precisely locates the slot 52 of the slide 30 in alignment with the aperture 40 and the bottommost clip C on the post 44 of the magazine. A lock nut 196 secures the cap screw of the assembly 189 in a desired position.

The lever arm 146 include bifurcated lower ends 166 (FIGS. 1 and 2) slidably connected to the outer ends of the bar portion 136 by a pair of links 168. Each link 168 has one end pivotally connected to the bifurcated end of its associated lever arm 146 by a stub shaft 170 and a longitudinal closed-end slot 172 at the other end. The outer ends of the bar portion 136 include enlarged portions 174, each of which is provided with upper and lower channels separated by a web 176. The webs are of a length greater than the thickness of the linkages 168 and of a depth somewhat less than the height of the slots 172. In connecting each one of the enlarged portions 174 to a link 168, its web 176 is disposed within the associated slot 172, and a cap 178 is releasably connected to the web.

Each one of the links 168 adjacent to the ends of the slots 172 includes inwardly directed stop assemblies 180 and 182, generally comprised of adjustable cap screws. The stop assemblies 180 and 182 are arranged to abut opposite sides of the enlarged potrions 174 of the bar element 132 whenever the bar element is at either end of the slots 172. When the enlarged portions 174 of the bar element 132 abut the cap scraws of the stop assemblies 180 and 182 during movement of the bar element 132, the links 168 are thereby moved in the same direction as the bar element 132, the levers 146 are pivoted about their shafts 150 and, in turn, the slide 30 is moved in a direction opposite to the links 168 and the bar element 132. In other words, when the actuator 126 moves in either direction, the bar element 132 and arm 14 are correspondingly moved in the same direction, but the slide 30 is not moved in the opposite direction until the enlarged portions 174 of the advancing bar element 132 abut the stop assemblies 180 and 182.

A downwardly projecting lug 200 (FIG. 1) is affixed to the forward end of the arm 14. An upstanding projection 202 is affixed to the top of the cover plate 24 adjacent to the forward plate 56 at the forked end 58 of the arm 54. The lug 200 abuts the projection 202 at the end of the receiving stroke of the arm 14 in order to precisely locate the fingers 15 of the arm 14 in clip transferring relationship with the slide 30. Although engagement of the lug 200 and projection 202 locate the fingers 15 in clip transferring relationship, the precise relationship between the fingers and the slide at the time of such engagement is achieved by adjustment of the stop assemblies 155 and 182. As with the scap screw on the stop assembly 189, a lock nut 188 can be provided to secure the cap screws of stop assemblies 182.

Figure 12A:
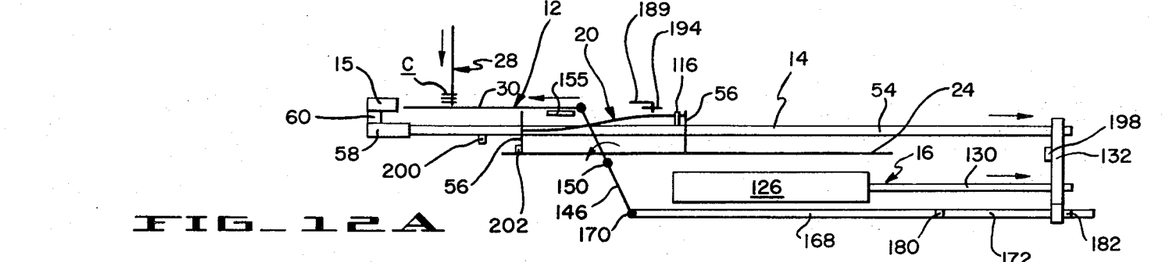
FIGS. 12A through 12C are diagrammatic operational views of the apparatus of the instant invention.
Figure 12B:
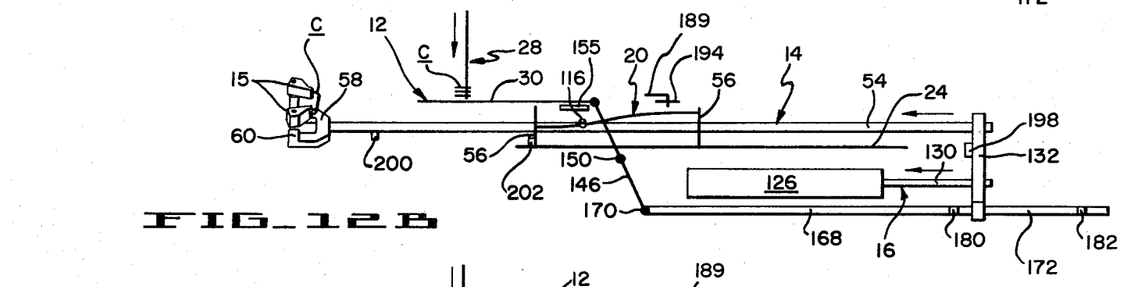
Figure 12C:
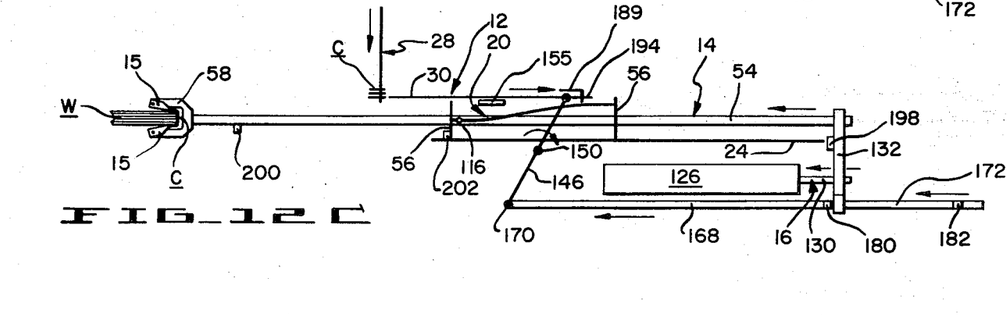

A projection 198 is affixed to the stem portion 134 of the bar element 132 and is directed inwardly toward and in longitudinal alignment with the adjacent end edge of the cover plate 24, as indicated in FIGS. 1–4. The projection 198 abuts the cover plate 24 during the forward stroke of the arm 14 to locate the fingers 15 in clip applying relationship with the workpiece W. Even though the projection 198 is fixed, as with the lug 202 and projection 202, the cap screws on stop assemlies 180 and 189 can be adjusted relative to each other to precisely locate the slot 52 of the slide 30 in alignment with the bottommost clip C disposed in the aperture 40 when the arm 14 is fully advanced in clip applying relationship with the workpiece W, as indicated in FIGS. 2 and 12C.

Although not heretofore described, the action of the fingers 15 of the arm 14 in effecting application of the clip C to a stack of boards or other workpiece W will now be set forth below. When the arm 14 is being advanced into clip applying relationship with the stack (FIGS. 2, 2A and 10), the opposed sides 67 of the fingers 15 slidably engage the side edge of a given stack, thereby forcibly spreading open the clip C and fitting it over the edge of the stack. When the arm 14 brings the web of the clip C into contact with the edge of the stack, then the fingers move beyond and become disengaged from the clip C, whereby the clip firmly grasps the stack of boards, as indicated in FIG. 2. After application of the clip C, the fingers 15 freely pivot about their shafts 62 in either direction whereby the clip engaging ends of the fingers 15 freely pass over the stack and the clip C applied thereto when the arm 14 is moved in the opposite direction toward the feeder device 12, as indicated in FIGS. 2 and 10.

It is to be understood that the actuator 126 can be operated by an appropriate control circuit (not shown) responsive to a given workpiece W moving along a conveyor (also not shown). With particular reference to FIGS. 12A to 12C, the operation of the described embodiment of the instant invention will now be briefly reviewed. As indicated in FIG. 12A, the actuator 126 has just moved rearwardly, thereby causing movement of the arm 14 in the same direction. The arm 14 and cam device 20 have moved to such an extent that the fingers 15 are oriented in a position for receiving the clip C from the slide 30. At the same time the bar element 132 has engaged the stop assemblies 182, thereby advancing links 168 to the right, pivoting levers 146 counterclockwise and moving the slide 30 forwardly into clip transferring relationship with the fingers 15. Prior to this movement, a clip C was deposited in the slide so that, in said transferring position, the clip is transferred from the slide to the fingers.

As indicated in FIG. 12B, the actuator 126 is moving forwardly such that the arm 14 is being moved forwardly and simultaneously rotated toward clip applying position adjacent to the side edge of the stack of boards W. At the same time, the bar element 132 is advancing between the ends of the slots 172 whereby the links 168, lever 146 and slide 30 are initially stationary, thereby maintaining the slide 30 in clip-transferring position even though the clip C has been transferred to the fingers 15. As is evident in FIGS. 12A to 12C, the distance travelled by the arm 14 in moving between a given workpiece W and the feeder device 12 is greater than the distance travelled by the slide 30 in moving between the clip magazine 28 and clip transferring position. Thus the slots 172 provide for lost motion between the actuator 126 and the slide 30 in order to effectively compensate for the difference in distance travelled by the slide 30 and arm 14.

As indicated in FIG. 12C, the actuator 126 has advanced to such an extent that the fingers 15 have moved into clip-applying relationship with the stack W. Further, the bar element 132 has been advanced into engagement with the stop assemblies 180, thereby advancing the links 168, pivoting the levers 146 clockwise, and retracting the slide 30 into alignment with the bottommost clip C of the magazine 28.

When the actuator 126 is moved rearwardly, after the arm 14 is in the fully advanced position shown in FIG. 12C, the slots 172 provide lost motion between the actuator 126 and slide 30 until the bar element 132 engages the stop assemblies 182. Upon such engagement, the slide 30 and arm 14 are moved in opposite directions relative to each other and into the clip transferring relationship shown in FIG. 12A.

From the foregoing, it will be understood that the apparatus 10 of the instant invention can feed and apply successive clips C to one or more workpieces at a mass production rate. By virtue of the apparatus 10 positively holding a given clip C during transfer and feeding from the magazine 28 to the slide 30, then from the slide 30 to the arm 14, and then from the arm 14 to the workpiece W safe, accurate and dependable cyclical operation of the apparatus is assured.

Although a preferred embodiment of the instant invention has been disclosed and described, it will be apparent that various changes and modifications may be made therein without departing from the scope thereof as defined by the appended claims.

What is claimed is:

1. In an apparatus for feeding an element, said apparatus comprising a feeder means including a slide for receiving an element, grasping means disposed in relation to said feeder means for receiving the element from said slide when said slide and said grasping means are in element transferring relationship, common drive means connected to said slide and said grasping means for synchronizing the operation of said slide and said grasping means so as to simultaneously locate said slide and said grasping means in element transferring relationship, said common means for advancing said slide from an element receiving position to element transferring relationship with said grasping means and for also advancing said grasping means out of element transferring relationship with said slide, and said grasping means including orienting means for effecting selected linear and arcuate movements of said grasping means during advancement of said grasping means out of element transferring relationship with said slide so as to properly orient said element at the time the element is transferred between said slide and said grasping means.

2. In an apparatus for feeding and applying a U-shaped spring clip to a workpiece, said apparatus comprising a clip applying means provided with clip grasping fingers, a feeder means for receiving a clip and for transferring the clip to said clip applying means, means associated with said feeder means for holding said clip at a proper attitude relative to said feeder means and for resisting movement of said clip out of said attitude while said feeder means applies said clip to said clip grasping fingers of said clip applying means, common means connected to said clip applying means and said feeder means for synchronizing the operations of said feeder means and said clip applying means so as to simultaneously locate said feeder means and said clip applying means in clip transferring relationship to each other, and orienting means for effecting selected linear and arcuate movements of said fingers of said clip applying means into and out of a clip transferring relationship with said feeder means.

3. An apparatus as set forth in claim 2 in which said associated means further includes a spring means.

4. An apparatus as set forth in claim 2 in which said orienting means includes a cam means.

5. An apparatus as set forth in claim 2, including means for cleaning said feeder means and said associated means during the feeding and applying of a clip to the workpiece by said apparatus.

6. An apparatus as set forth in claim 2 in which said fingers include a pair of finger means having groove-like means for freely-receiving and graspingly engaging the outer ends of said clip when said clip-applying means and said feeder means are in clip transferring relationship.

7. An apparatus as set forth in claim 3 in which said clip grasping fingers include a pair of finger means pivotally mounted on said clip applying means.

8. An apparatus as set forth in claim 7, including stop means on said clip applying means for limiting the pivotal movement of said pair of finger means.

9. An apparatus as set forth in claim 7, including means on said clip applying means for biasing the pivotal movement of said pair of finger means to an outward expanded position in order to effect grasping engagement of said pair of finger means with the outer ends of said clip when said feeder means and said clip applying means are in a clip transferring relationship.

10. An apparatus as set forth in claim 9, including cam means on said apparatus for operatively engaging said pair of finger means in order to effect pivoting of said pair of finger means in a direction against the urgency of said biasing means, thereby pivoting said pair of finger means to a retracted position so as to freely receive the outer ends of a clip when said feeder means and said clip means are in a clip transferring relationship.

11. In an apparatus for feeding and applying a U-shaped spring clip to a workpiece, said apparatus comprising a magazine for storing a series of clips, a clip applying means provided with clip grasping fingers and a feeder means for receiving a bottommost clip from the magazine and for transferring the bottommost clip to said clip applying means, means associated with said feeder means for holding said clip at a proper attitude relative to said feeder means and for resisting movement out of said attitude while said feeder means applies said clip to said clip grasping fingers of said clip applying means, common means connected to said clip applying means and said feeder means for synchronizing the operations of said feeder means and said clip applying means so as to simultaneously locate said feeder means and said clip applying means in clip transferring relationship to each other, said common means for also advancing said clip applying means from clip transferring relationship with said feeder means into clip applying relationship with said workpiece, and orienting means disposed in relation to said clip applying means and said common means for effecting selected linear and arcuate movements of said fingers of said clip applying means during advancement of said clip applying means between said workpiece and said feeder means by said common means.

12. In an apparatus as set forth in claim 11 in which said clip applying means is disposed in one position for receiving a clip in clip transferring relationship with said feeder means and in which said clip applying means is adapted to be disposed in another advanced and angularly rotated position relative to the one position in order to apply a clip to the workpiece when said common means advances said clip applying means toward the workpiece in conjunction with said orienting means effecting selected linear and arcuate movements of said clip applying means.

13. In an apparatus as set forth in claim 11 in which said clip grasping fingers are comprised of a pair of finger means pivotally mounted on said clip applying means.

14. In an apparatus as set forth in claim 13 including cam means disposed in relation to said clip applying means for engaging said finger means in order to effect pivotal movement of said finger means to a retracted position to freely receive a clip when said feeder means and said clip applying means are in clip transferring relationship and said clip applying means including stop means for limiting the pivotal movement of said finger means so as to assure engagement with said cam means.

15. In an apparatus as set forth in claim 13, including biasing means for engaging said pair of finger means and for urging said finger means to an expanded position to holdably engage the ends of a U-shaped spring clip when said clip applying means is advanced towards said workpiece after clip transferring relationship with said transfer means.

16. In an apparatus as set forth in claim 15, including cam means disposed in relation to said clip applying means for engaging said pair of finger means in a direction counteracting the engagement of said biasing means therewith when said clip applying means and said feeder means are in clip transferring relationship.

17. In an apparatus for feeding and applying a U-shaped spring clip to a workpiece, said apparatus comprising a magazine for storing a series of clips, a clip applying means provided with clip grasping fingers and a feeder means including a slide means for receiving a bottommost clip from the magazine and for transferring the bottommost clip to said clip applying means, means associated with said feeder means for holding said clip in said slide means at a proper attitude relative to said feeder means and for resisting movement out of said attitude while said slide means applies said clip to said clip grasping fingers of said clip applying means, common means connected to said clip applying means and said slide means for synchronizing the operations of said slide means and said clip applying means so as to simultaneously locate said slide means and said clip applying means in clip transferring relationship to each other, said common means for advancing said slide means in a direction from clip transferring relationship with said clip applying means into alignment with said magazine and for also advancing said clip applying means in a direction from clip transferring relationship with said slide means into clip applying relationship with said workpiece, and orienting means disposed in relation to said clip applying means and said common means for effecting selected linear and arcuate movements of said fingers of said clip applying means during advancement of said clip applying means between said workpiece and said slide means by said common means.

18. In an apparatus as set forth in claim 17 in which said slide means is provided with pocket means for receiving a bottommost clip from said magazine.

19. In an apparatus as set forth in claim 17, including stop means associated with said clip applying means for precisely locating said clip applying means in clip applying relationship with said workpiece upon advancement of said common means in one direction and for precisely locating said clip applying means in clip transferring relationship with said slide means upon advancement of said common means in an opposite direction.

20. In an apparatus as set forth in claim 17 in which said common means is comprised of lever and linkage means for interconnecting said slide means and said clip applying means and for effecting advancement of said slide means and said clip applying means in opposite directions relative to each other upon actuation of said common means.

21. In an apparatus as set forth in claim 20 in which said common means is comprised of an actuator for effecting actuation of said lever and linkage means.

22. In an apparatus as set forth in claim 20 in which said lever and linkage means includes a slot means for effecting relative lost motion between said clip applying means and said slide means whereby said clip applying means advances a greater distance than said slide means upon advancement of said common means in either direction.

23. In an apparatus as set forth in claim 20 in which stop means are arranged on both said lever and linkage means and said feeder means for precisely locating said slide means in alignment with the bottommost clip of said magazine upon advancement of said common means in one direction and for precisely locating said slide means in clip transferring relationship with said clip applying means upon advancement of said common means in an opposite direction.

24. In an apparatus as set forth in claim 23 in which said lever and linkage means includes a slot means for effecting relative lost motion between said slide means and said clip applying means and in which said stop means of said lever and linkage means are disposed in relation to opposite ends of said slot means.

References Cited
UNITED STATES PATENTS

| | | | |
|---|---|---|---|
| 2,457,766 | 12/1948 | Young | 29—211 |
| 2,707,818 | 5/1955 | Page | 29—208 |
| 2,862,289 | 12/1958 | Womack et al. | 29—208 |

THOMAS H. EAGER, Primary Examiner

U.S. Cl. X.R.

29—229